United States Patent [19]

Sykes

[11] 3,813,108
[45] May 28, 1974

[54] WORKPIECE HOLDERS
[76] Inventor: Alfred Ernest Sykes, 329 Leicester Rd., Markfield, England
[22] Filed: May 12, 1972
[21] Appl. No.: 252,868

Related U.S. Application Data
[62] Division of Ser. No. 31,151, April 23, 1970, Pat. No. 3,685,844.

[30] Foreign Application Priority Data
Apr. 29, 1969 Great Britain.................... 21846/69

[52] U.S. Cl..................... 279/4, 279/1 DC, 279/23, 279/107
[51] Int. Cl........................................ B23b 31/16
[58] Field of Search ..... 279/1 DC, 1 F, 1 SG, 1 TE, 279/4, 23, 43, 46, 50, 74, 107, 102

[56] References Cited
UNITED STATES PATENTS

| | | | |
|---|---|---|---|
| 2,562,134 | 7/1951 | Smitka................................. | 279/4 |
| 2,733,071 | 1/1956 | Renoux................................ | 279/4 |
| 2,958,533 | 11/1960 | Benjamin et al..................... | 279/4 |
| 2,998,259 | 8/1961 | Farnsworth.......................... | 279/50 |

FOREIGN PATENTS OR APPLICATIONS

| | | | |
|---|---|---|---|
| 874,800 | 8/1942 | France................................. | 279/43 |
| 921,522 | 3/1963 | Great Britain........................ | 279/46 |

Primary Examiner—Andrew R. Juhasz
Assistant Examiner—Z. R. Bilinsky
Attorney, Agent, or Firm—Holman & Stern

[57] ABSTRACT

A workpiece holder in which a rotatable tubular body is positioned within an outer stationary tubular part, with the inner body being of resilient material and having a plurality of workpiece engaging members, a finger integrally connected at one end portion to the body and having an opposite free end portion circumferentially spaced from the end portion connected to the body, the free end portion forming a workpiece engaging member, the free end portion being adapted to flex relative to the body about the end portion of the finger integrally connected to the body for causing movement of the free end portion and workpiece engaging member in generally radial directions with respect to the axis of rotation of the body, and a pivoted arm connected to the finger and an axially movable tapered ring cooperable with the arm for effecting pivotal movement of the arm for applying a force to flex the free end portion of the finger.

2 Claims, 2 Drawing Figures

3,813,108

WORKPIECE HOLDERS

This application is a division of my copending application, Ser. No. 31,151 filed Apr. 23, 1970 now U.S. Pat. No. 3,685,844.

BACKGROUND OF THE INVENTION

This invention relates to workpiece holders such as chucks and mandrels and has as its object the provision of such a workpiece holder in an improved form.

Generally, the present workpiece holder includes a rotatable body of resilient material having a plurality of workpiece engaging members, a finger integrally connected at one end portion to the body and having an opposite free end portion circumferentially spaced from the end portion connected to the body, the free end portion forming a workpiece engaging member, the free end portion and workpiece engaging member being adapted to flex relative to the body about the integrally connected end portion of the finger for causing movement of the free end portion in generally radial directions with respect to the axis of rotation of the body, and means operably associated with the free end portion for applying a force to flex the free end portion and workpiece engaging member, said last named means including a pivoted arm connected to the finger and an axially movable tapered ring operably related to the arm for effecting pivotal movement of the arm.

Preferably, a plurality of fingers are provided and are connected respectively to the plurality of workpiece engaging members. The body is in the form of a tubular, preferably cylindrical, member and, the workpiece, when engaged and held by the workpiece engaging members, extends through the tubular member.

BRIEF DESCRIPTION OF THE DRAWINGS

The invention will now be more particularly described with reference to the accompanying drawings wherein.

DETAILED DESCRIPTION OF THE INVENTION

Figure 1:
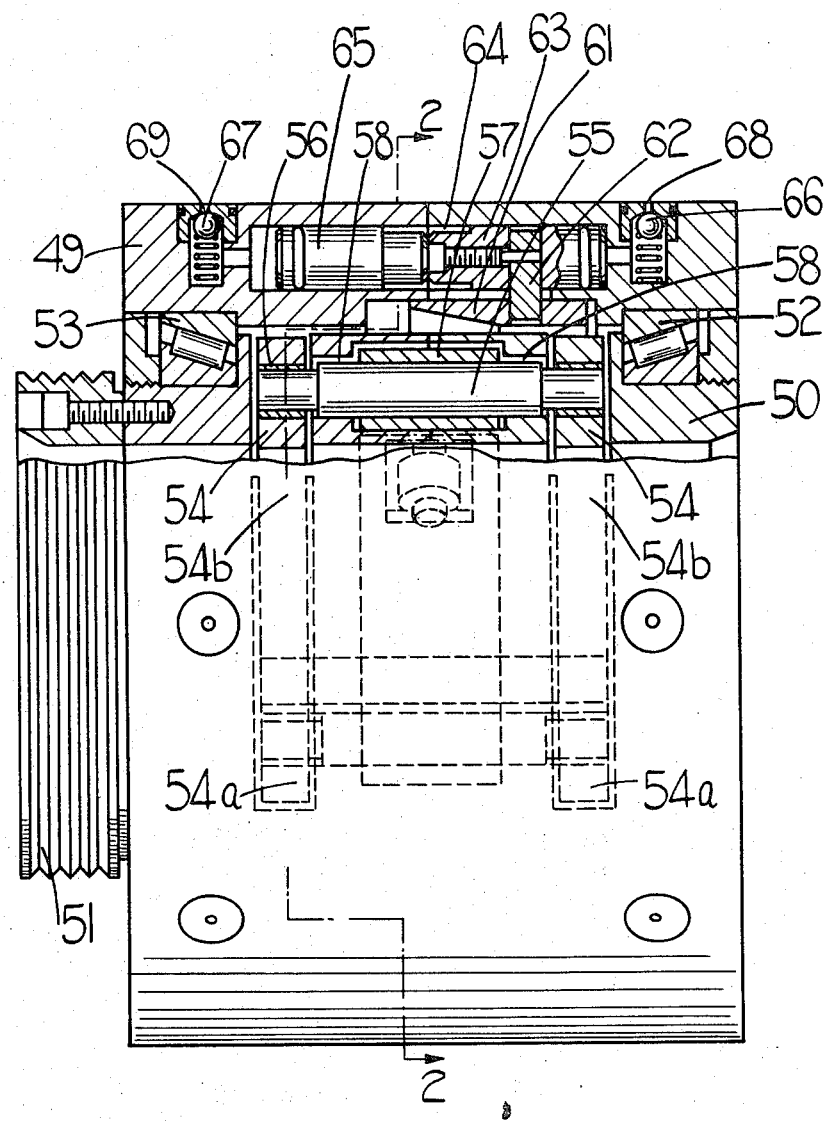
FIG. 1 is a view partly in side elevation and partly in cross-section of the workpiece holder.
Figure 2:
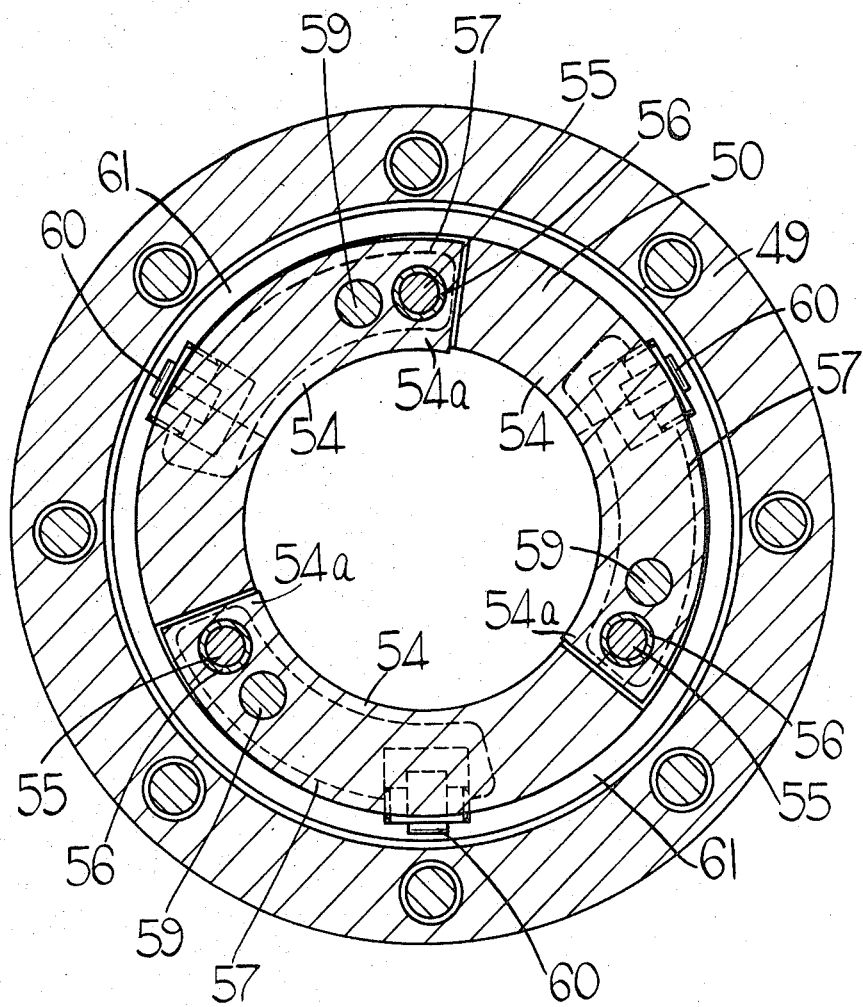
FIG. 2 is a view taken along the line 5—5 of FIG. 1, the view looking in the direction of the arrows.

As shown in FIGS. 1 and 2, the chuck is of generally tubular cylindrical form, and includes an outer stationary part 49 and an inner tubular body 50. The body 50 is connected at one end by suitable means to a pulley 51, whereby the body 50 can be rotated relative to the stationary part 49 on bearings 52 and 53 located between the part 49 and the body 50. On each side of the median diametral plane of the body 50 there is provided a plurality of fingers 54 which are each formed by cutting a U-shaped slot through the thickness of the wall of the body 50 so that each finger is free at one end 54a and is integrally connected at its other end 54b to the remainder of the body, with the body being made of a resilient material such as an alloy steel. There are thus provided two sets of fingers at opposite axial ends of the body and the fingers of one set are aligned with the fingers of the other set looking in an axial direction. Each axially aligned pair of fingers 54 is interconnected by an axially extending pin 55 which, as shown in FIG. 1, extends at each end into a bushing 56 fitted to the adjacent finger and intermediate its ends, the pin 55 extends through a bore formed in an arm 57. It can be seen in FIG. 1 that a clearance 58 is provided between that part of the pin 55 intermediate its ends and the body and also between the body and the arm 57. Intermediate its ends, each arm 57 is mounted on a fulcrum pin 59 mounted in the body and at that end of each arm opposite to the pin 55 is a roller 60 carried by a suitable bracket connected to the arm. Each of the rollers 60 is adpated to engage a tapered ring 61 which is connected, by means of lugs 62, to a plurality of circumferentially spaced pistons 63, with only one lug and one piston 63 being seen in FIG. 1. Each piston 63 is mounted in one end of a cylinder 64 and in the other end of the cylinder is a further piston 65 and non-return valves 66 and 67 are provided adjacent to ports 68 and 69 for the purpose of admitting pressurized fluid to one end or the other end of the cylinder 64. All of the circumferentially spaced cylinders 64 and associated pistons 63 and 65 operate in the same manner so that description will be limited to one such assembly.

Thus, viewing FIG. 1, if pressurized fluid is admitted via ports 68 past the non-return valves 66 into the right-hand end of the cylinders 64, the two pistons 63 and 65 in each cylinder will be moved to the left and the tapered ring 61 will also be moved in the same direction. The tapered ring will then engage the rollers 60 on the arms 57 and this will have the effect of pivoting the arms about their pivot pins 59 so that the pins 55 are moved radially outwardly. The pins 55, in turn, will move the fingers 54 radially outwardly and therefore release any component previously held by the fingers and extending through the tubular body 50. A new component can then be inserted into the tubular body 50 and pressurized fluid admitted to the left hand end of the cylinders 64 as seen in FIG. 1 via the ports 69 while pressure is released from the right-hand end of the cylinders 64. This, in turn, will move the tapered ring 61 from left to right as seen in FIG. 1 and the fingers 54 will then be able to move radially inwardly under the resilience of their connection to the remainder of the tubular body 50 so as to exert a resilient grip on the new component placed in the chuck. It is, of course, understood that with the tapered ring 61 in its right-hand position as shown in FIG. 15, the fingers 54 would naturally move radially inwardly to a position which is somewhat nearer to the axis of the tubular body 50 in the absence of a component in the tubular body. If the component is therefore in position, it will be gripped by inward radial contraction of the free ends of the fingers 54 when the tapered ring 61 is moved from left to right. However, the free end of each finger 54 will move in a plane parallel to a diametral plane of the body 50 so that a firm and secure grip can be obtained over a finite axial length of a component inserted into the chuck.

In the above-described construction, the free ends of the fingers themselves act as the workpiece engaging members or jaws although separately formed jaws may be attached to the fingers instead. Furthermore, in an alternative construction, a generally tubular chuck as shown in FIGS. 1 and 2 may have only one movable finger (which may have an attached or integrally formed jaw) and this movable finger would co-act with a plurality of fixed jaws.

What is claimed is:

1. A workpiece holder having a longitudinal axis of rotation comprising an outer stationary tubular part, a rotatable inner tubular body, said inner body being of resilient material and having a plurality of workpiece engaging members, a plurality of fingers located on each side of a median diametral plane transverse to said longitudinal axis thus providing two sets of fingers at opposite axial ends of the body, each finger being integrally connected at one end portion to the body and having an opposite free end portion circumferentially spaced from the end portion connected to the body, the fingers of one set being aligned with the fingers of the other set viewed in an axial direction, a workpiece engaging member carried by each free end portion, the free end portions and workpiece engaging members being adapted to flex relative to the body about the end portion of the finger integrally connected to the body for causing movement of the free end portions and workpiece engaging members in generally radial directions with respect to the axis of rotation of the body, and means for applying a force to flex the fingers and workpiece engaging member in one radial direction, the resilience of the material of the body and the fingers causing the free end portions and workpiece engaging members to move in the other radial direction when the force is removed, said last named means including a pivoted arm connected to each finger and an axially movable tapered ring operably related to the pivoted arms for effecting pivotal movement of the arms.

2. The workpiece holder as claimed in claim 1 in which each arm is mounted on a fulcrum pin carried by the body, a roller supported by the end of each arm remote from its connection to the finger, each roller being adapted to engage the tapered ring, said tapered ring being connected to a plurality of circumferentially spaced pistons, with each piston being mounted in a cylinder in the stationary part, a second piston in each cylinder, a port for each end of each cylinder, a non-return valve for each port whereby upon admission of pressurized fluid in one of the ports, the two pistons will be moved in a first direction thus moving the tapered ring in the same direction to engage the rollers and pivot the arms so that the free end portions of the fingers move radially outward to release a workpiece held by the workpiece engaging members, while admission of fluid to the other port moves the ring in the opposite direction to disengage from the rollers whereby the free end portions of the fingers and the workpiece engaging members can flex radially inwardly under the resilience of their connections to the body to exert a grip on a workpiece inserted into the tubular body.

* * * * *